Patented Jan. 6, 1931

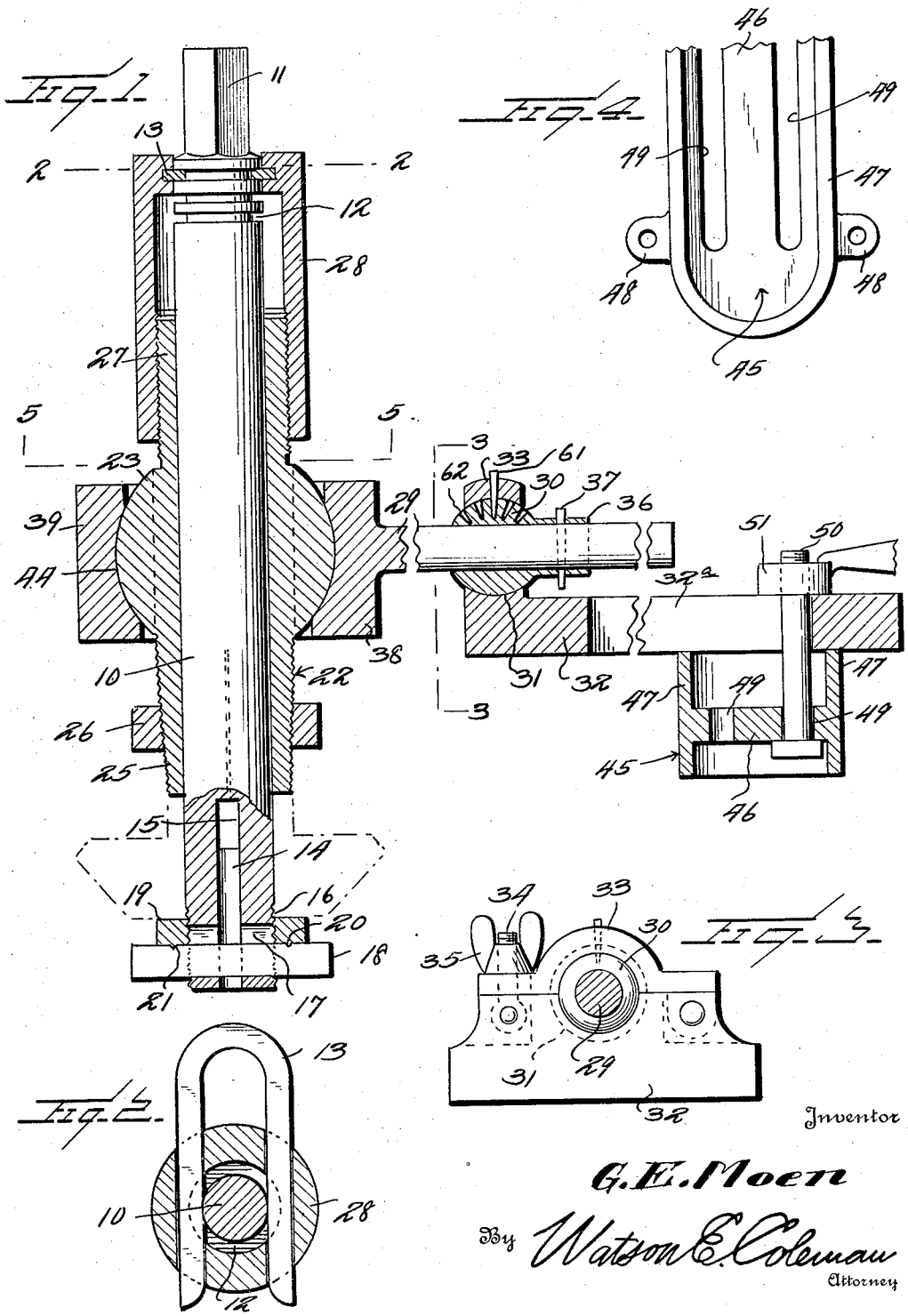

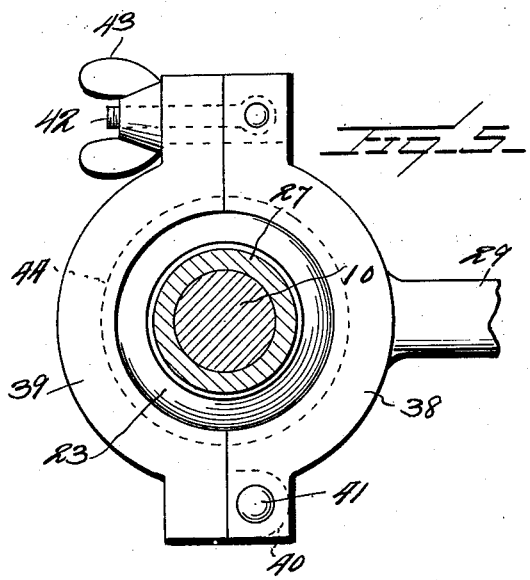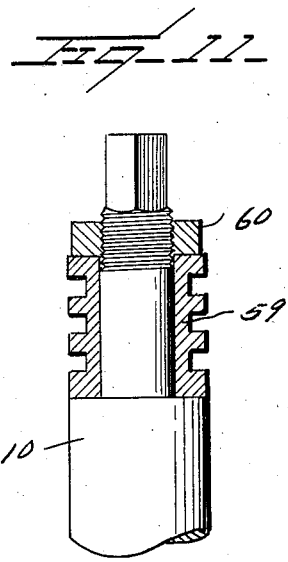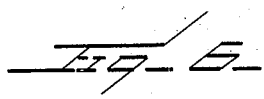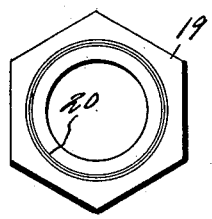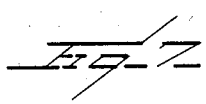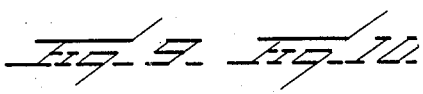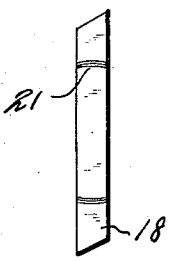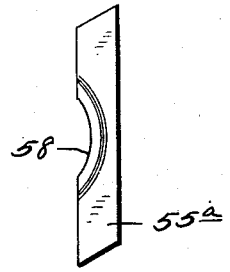

1,787,871

UNITED STATES PATENT OFFICE

GEORGE E. MOEN, OF KELSO, WASHINGTON

TOOL FOR BORING AND REAMING

Application filed February 17, 1927. Serial No. 168,997.

This invention relates to boring or reaming devices and particularly to a combination tool designed especially for the purpose of operating upon valve seats, valves, and other allied parts of engines or for doing a large variety of different kinds of work analogous thereto.

The general object of the present invention is to provide a tool of this character of a relatively cheap and simple construction having means whereby it may be mounted upon an engine block or other body and by which ports may be bored, valve guides reamed, seats trued up or narrowed, and other work of this character performed.

Another object is to provide means whereby the tool supporting spindle is carried on a ball and socket joint so that the spindle may be adjusted in a plurality of directions.

Still another object is to provide supporting means for the spindle and the holder thereof whereby the spindle may be brought into any desired relation to the work and held in this position and, in this connection, to provide supporting means which, without changing the adjustment, may be opened to release the tool holder and permit the insertion of another tool holder or the same holder with another tool, and further provide for the return of certain parts of the support to their adjusted position without having to readjust the support.

A further object is to provide means for supporting the tool upon an engine block such that the tool and its holder may be adjusted either longitudinally or transversely of the supporting means and held rigidly in this position, the supporting means being such as to permit the ready disengagement of the spindle therefrom.

A still further object is to provide means whereby the tool may be fed to the work from time to time if necessary.

Other objects will appear in the course of the following description.

My invention is illustrated in the accompanying drawings wherein:—

Figure 1 is a vertical sectional view of a tool constructed in accordance with my invention;

Fig. 2 is a section on the line 2—2 of Figure 1;

Fig. 3 is a section on the line 3—3 of Figure 1;

Fig. 4 is a fragmentary top plan view of the base 45;

Fig. 5 is a section on the line 5—5 of Figure 1;

Fig. 6 is an underside face view of the nut 19;

Fig. 7 is a face view of the tool or bar 18;

Fig. 8 is an elevation of the lower end of the spindle, showing in section a modified manner of supporting the tool;

Figures 9 and 10 are face views of tools used with the construction shown in Figure 8;

Fig. 11 is a fragmentary elevation partly in section, showing a modified way of constructing the upper end of the spindle or tool holder.

Referring to the drawings, the tool holder, as shown in Figure 1, consists of a spindle 10 which is cylindrical in form and which at its upper end is provided with a many sided head 11 whereby the spindle may be rotated. This spindle at its upper end below this head is formed with a plurality of circular grooves 12 with which a U-shaped handle 13 may be engaged, as shown in Figure 2.

The spindle 10 at its lower end is provided with a longitudinally extending bore or socket 14 for the reception of a tool. This socket may be either tapered or straight, depending upon whether the tool is tapered or straight, and intersecting this socket at the upper end thereof is a drift opening 15 having the form of a rectangular slot. The lower end of the spindle is exteriorly screw-threaded, as at 16, and formed with a transverse slot 17 through which a cutting or abrading tool may be inserted. This tool 18 is held in place by the nut 19 engaging the screw-threads 16. Preferably the nut is formed with a downwardly projecting spur 20 and the tool 18 on its upper face is formed with the groove 21 into which said spur engages. The spur and groove will lock the tool 18 firmly in place within the transverse slot 17 when the nut 19 is screwed down.

The spindle 10 passes through a tubular holder 22, the middle portion of which is preferably spherical, as at 23. The holder 22 below the ball 23 at 25 is tapered and screw-threaded and preferably this downward extension 25 is longitudinally split at one or more points. The tapered portion receives the nut 26 and thus by turning up on this nut, the lower portion of the holder may be contracted upon the spindle so as to take up wear. Preferably the holder 22 is formed to provide an upwardly extending sleeve 27 above the ball, which sleeve is exteriorly screwthreaded. It is to be understood, however, that under some circumstances the holder need not extend above the ball and the holder instead of being spherical at its middle may be cylindrical. This will be explained later.

Engaging the screw-threads of the extension 27 is a sleeve 28 which extends upward and is flanged at its upper end and through this flange passes the two arms of a U-shaped handle 13. Thus, as this handle is rotated, the sleeve 28 will be rotated in one direction or the other and this rotation will cause the downward feed of the spindle through the spindle holder or the upward movement of the spindle.

The tool holder 22 is designed to be mounted upon the end of the rod 29 which may be either round or rectangular in cross section and which has sliding engagement with a ball 30 mounted in a socket 31 formed upon the end of a longitudinally slotted supporting plate 32. The upper wall of the socket 31 is formed by a hinged member 33 whose free end may be held closed by a bolt 34 and nut 35. The ball preferably carries the extension 36 forming a continuation of the bore of the ball and this is perforated for the passage of a pin 37 (which is preferably tapered) at one definite point in this rod.

One end of this rod, as before explained, is intended to engage and provide a socket for the ball 23. This socket may be formed in many ways but as illustrated is formed of two jaws, one of these jaws 38 being preferably integral with the rod 29 and the other jaw 39 having an ear 40 having hinged connection to the jaw 38 by means of the pin 41 passing through the ear. The free ends of the jaws 38 and 39 are provided with aligned bores through which the bolt 42 passes carrying the wing nut 43. These two jaws 38 and 39 are formed with semi-spherical cavities and when the two jaws are together these cavities form a socket 44 with which the ball 23 is disposed. When the nut 43 is loosened, the ball may be oscillated in any radial direction within this socket and when the nut 43 is tightened up, the ball will be held rigidly in place against any movement after once being adjusted.

While I do not wish to be limited to a particular mounting or support for the plate or bracket 32, it is obvious that some sort of support must be used which will permit a bolt to pass downward through the slot 32$^a$, so as to clamp this bracket or arm in an adjusted position. Such a bolt may pass down into the work itself or into a supporting block bolted to the work or be used in connection with the supporting brackets shown in my Patent 1,781,338, granted November 11, 1930. Preferably, however, for the support of the member 32 I provide a base 45. This is preferably a casting so formed as to provide a web 46 and an integral rim 47 formed with lugs 48 whereby this base may be connected by bolts or the like to the work or to any other suitable support. The web 46 is preferably disposed about one-third of the distance from top to bottom of the rim 47 so that this base 45 may be used either side up and with the web 46 either above or below the middle plane of the member 45, greater latitude being thus attained in reaching studs to which to fasten the member 45, which studs may be already in the block, or head, or other work upon which this device is to be placed. The web 46 is longitudinally slotted, as at 49, there being preferably two of these slots, and a bolt or bolts 50 may pass through the 32$^a$ and through these slots 49 to thus hold the bracket 32 in properly adjusted position upon the base 45. Nuts 51 will, of course, engage the bolts 50. If two bolts 50 are used the bracket 32 will be held rigidly in its adjusted position. With one bolt, however, the bracket may be more readily shifted out of its adjusted position.

While I have heretofore described the tool 18 as passing through the slot 17, a pilot bar may also be passed through this slot 17 and held in place by the nut 19. I do not wish to be limited to this manner of carrying the tool 18, however, as in Figure 8, I show a spindle which is not provided with the slot 17 but which is somewhat tapered at 52 and which carries a sleeve 53, this sleeve being formed with a groove 54 adapted to receive the tool 55 or 55$^a$ as shown in Figures 9 and 10. The tool 55 is provided with the arcuate groove to receive the projection 56 carried upon the nut 57 which engages the screw-threads on the sleeve 53. The tool 55$^a$ is like the tool 55 except that it is cut out at one side as at 58. The slots 54 may either extend circumferentially around the sleeve 53 or tangentially across the sleeve, being open at opposite ends. In that case the slots may be upon the inner face of the sleeve and there may be grooves in the spindle to correspond. Thus, the tool itself, being engaged with the spindle or power shaft constituted thereby, would prevent any possibility of the tapered sleeve from slipping.

It is to be understood that the lower end of the tool holder 10 may be readily formed to receive a tool extending longitudinally of the tool holder as well as a tool such as 18 extending transversely thereof or the tool shown in Figures 7, 9 and 10.

It is to be understood that the spindle 10 which constitutes a tool holder may not only carry a longitudinally extending tool within the bore 14 or a transversely extending tool such as 18, but may also carry a reamer or other like tool which may be mounted on the lower end of a shaft or tool holder 10 and rotated therewith. Such a reamer is illustrated in my co-pending application for patent before referred to, and a reamer is shown in dotted lines in Figure 1 as being mounted upon the tool holder or shaft. This reamer may be engaged with the spindle by making the spindle tapered and either round or square or it may be engaged with the spindle by a screw-thread and lock nut. The bore 14 may carry a member which will constitute a pilot or may carry a tool 18 as described and when the tool is carried within the bore 14 as, for instance, a boring or drilling tool, a pilot bar may be used in the slot 17.

The member 13 constitutes a handle whereby the sleeve or nut 28 may be turned without, however, turning or preventing the independent rotation of the shaft or spindle 10. By turning the sleeve 28 it will be shifted up or down upon the screw-threaded portion 27 of the member 23 and thus the spindle will be fed. The member 13, therefore, locks the spindle 10 in engagement with the feed nut constituted by the sleeve 28 for unitary vertical movement but permits, of course, independent rotation. By withdrawing this locking member 13, the spindle may be shifted relative to the feed nut upward or downward to secure a coarse adjustment and then locked in position by a re-insertion of the locking member. The locking member 13 when inserted eliminates all end play between the feed nut and the spindle and yet allows the spindle to rotate. The spindle 10 is readily adjusted to any particular job by removing the locking member 13, shifting the spindle so as to bring the reamer or other tool into an approximate position, again locking the spindle and the feed nut 28 by the member 13, and then rotating the feed nut or sleeve to raise or lower the spindle.

In Figure 11 I have illustrated a slight modification of the construction shown in Figure 1, by providing the removable sleeve 59 which fits over a reduced portion at the upper end of the shaft or spindle 10 and is held in place by the nut 60, this sleeve 59 providing means whereby when the grooves in the sleeve are worn, the sleeve may be thrown aside and a new sleeve put in place.

The use of this mechanism will be obvious from what has gone before. The base 45 is bolted to the work, if the base is used, and the arm 32 in turn bolted to this base. The rod 29 is properly adjusted and the jaw 39 opened and the tool holder 22 inserted within the jaws, the proper tool having been first applied to the spindle or shaft 10. By means of the several adjustments heretofore pointed out, it is an easy matter to bring the tool exactly to the point required and exactly in alignment with any guide or other opening, bore, or the like which is concentric to the tool to be used. The upper end of the shaft or spindle is to be engaged in any suitable manner with a wrench, air motor, or other mechanical power whereby it may be rotated. Work is then proceeded with, feeding being done as required by operating the feed nut or sleeve 28. In order to change the tool for other operations, or because the tool is worn, the wing nut 43 alone may be loosened to permit the opening of the jaw 39 and then a new tool may be inserted in the shaft or spindle 10. The tool holder with the tool may now be disposed in the correct position and the wing nut 43 is then tightened up and work may be proceeded with. This change may be made very quickly, and with only one wing nut to be loosened it is obvious that the new tool can be disposed in exactly the same position occupied by the old tool. It is also possible with this mechanism to shift the bar 29 outward or inward so as to carry the tool holder and tool into better positions for replacing the tool, and then the rod 29 may be shifted back exactly to its original adjustment by reason of the fact that only when it is shifted to its original adjustment can the pin 37 pass through the opening in the sleeve 36 and bar 29.

It will be understood that a set screw may be used extending through the socket for the ball 30 or through the walls of the socket for the ball 23 so as to engage the corresponding ball and hold it set in any adjusted angular position. After an operation has been completed on one element or portion of the work, the member 32 may be shifted so as to bring the tool into position to operate on the next work to be done on the same engine block. This method of mounting the tool, therefore, permits the base to be clamped upon the engine block and then the member 32 may be shifted so as to carry the tool from one cylinder or one valve bore to the next succeeding cylinder or valve bore without removing the base from the engine block.

It will be seen that I have provided a combination tool which will repair or renew valve seats where the valve stem guide is not worn enough to require reaming but which may be a trifle out of line with the surface of the block or head. This is secured by the use of a ball and socket joint which takes care of any angular disposition of the tool. In many instances this will entirely save the cost of new valves. Old reamers can be readily applied to the spindle 10 or in the event that the operator does not care to go to the expense of buying reamers, the tools 18, 55 or 55ª may be used. The usual jigs for drilling or reaming valve stem guide holes or for other operations can be readily applied when needed. Reaming angular seats or valve stem guides can be readily accomplished because of the range of angular adjustment obtainable for the spindle 10 and the tool by reason of the ball and socket support for the tool.

By using a straight tubular holder 22, as shown in dotted lines in Figure 1, the holder may be used for performing operations where no angular adjustment is required and where on the contrary, it is absolutely necessary that the tool be held at right angles to the face of the work. For some kinds of work the portion 25 may be made of other shapes and used for other purposes. For example, it may be made straight exteriorly and used as a pilot when reaming globe valves. The socket formed of the members 38 and 39 it is to be understood, may have removable facing plates, as illustrated in Figure 6 of Patent 1,781,338 of November 11, 1930 heretofore referred to.

I claim:—

1. A tool of the character described, including a supporting arm having separable clamping jaws at one end, means for holding the jaws in clamping position, a spindle guide clamped between said jaws, a tool carrying spindle extending therethrough, the spindle projecting above the guide and having means at its upper end whereby it may be rotated, a longitudinally slotted supporting plate, a tubular ball mounted in a socket upon the plate and through which the arm passes, and means for locking the arm to the ball at a predetermined point.

2. A tool of the character described including a supporting arm having separable clamping jaws at one end, means for holding the jaws in clamping position, a spindle guide clamped between said jaws, a tool carrying spindle extending therethrough, a longitudinally slotted supporting plate, a tubular ball mounted in a socket upon the plate and through which the arm passes, and means for locking the arm to the ball at a predetermined point including a sleeve projecting from the ball and surrounding the arm and apertured at opposite points, the arm being apertured, and a tapered pin insertible through the aligned apertures.

3. A tool of the character described including a supporting arm having separable clamping jaws at one end, a spindle guide clamped between said jaws, a spindle extending therethrough, a supporting plate for the arm and with which the arm has sliding engagement, means for locking the arm in predetermined relation to the sliding plate, said means preventing locking the arm until it has been shifted to this predetermined relation, and a longitudinally slotted base upon which the plate is mounted for adjustment longitudinally and angularly.

4. A tool of the character described including a supporting arm having separable clamping jaws at one end, a spindle guide clamped between said jaws, a spindle extending therethrough, a supporting plate for the arm and with which the arm has sliding engagement, means for locking the arm in predetermined relation to the sliding plate, said means preventing locking the arm until it has been shifted to this predetermined relation, the supporting plate being longitudinally slotted, and a longitudinally slotted base extending at an angle to the supporting plate and with which the supporting plate engages, and means for locking the slotted plate upon the supporting base in any adjusted position.

5. A tool of the character described including a supporting arm having separable clamping jaws at one end, a spindle guide clamped between said jaws, a spindle extending therethrough, a supporting plate for the arm and with which the arm has sliding engagement, means for locking the arm in predetermined relation to the sliding plate, said means preventing locking the arm until it has been shifted to this predetermined relation, the supporting plate being longitudinally slotted, and a supporting base extending at an angle to the supporting plate, the base having two longitudinally extending parallel slots, and means engaging through the slot in the plate and the slot in the base for holding the plate in adjusted positions.

6. A tool of the character described including a supporting arm having separable clamping jaws at one end, a spindle guide clamped between said jaws, a tool carrying spindle extending therethrough, a longitudinally slotted plate upon which the arm is detachably mounted for adjustment into a plurality of angular relations to the plate, a base plate having means whereby it may be clamped upon the work, said base plate having a web extending parallel to the bottom of the base plate and unequally spaced from the top and bottom faces thereof, said web being longitudinally slotted, and means engaging the slot in the web and the slot in the plate for holding the plate in adjusted position upon said base.

7. A tool of the character described including a supporting arm having separable clamping jaws at one end, a spindle guide clamped between said jaws, a spindle extending therethrough and adapted to carry a tool, a longitudinally slotted plate having a ball socket at one end, a ball mounted in the socket and through which the arm slidingly passes, means for holding the arm locked to the ball, and a base upon which the plate is mounted, said base having a longitudinally slotted web and having means whereby it may be engaged with a piece of work, and means passing through the slots of the plate and base for locking them to each other in adjusted positions.

8. A tool of the character described including a supporting arm having separable clamping jaws at one end, the clamping jaws being formed to provide a ball socket, a spindle guide clamped between said jaws and having a ball engaged in said socket whereby the guide may be shifted into a plurality of angular relations to the supporting arm, the jaws permitting the removal of the guide, a tool carrying spindle extending through the spindle guide, a supporting plate for said arm having a ball socket, a ball disposed in said socket for oscillation therein and having a bore through which the supporting arm slides, means for locking the supporting arm to the ball, and a base upon which the plate is mounted, said base having means whereby it may be engaged with a piece of work and having a longitudinally extending slot, and means passing through the slotted plate and slot of the base for holding the plate in adjusted positions upon the base.

9. A tool of the character described including a supporting arm having separable clamping jaws at one end, a spindle guide clamped between said jaws, a tool carrying spindle extending therethrough, a longitudinally slotted supporting plate, a means on said plate for adjustably engaging said supporting arm, said means permitting the supporting arm to be shifted therethrough and shifted into a plurality of angular relations, a base for said plate and normally extending at an angle thereto, the base being longitudinally slotted, a bolt passing through the slot of the plate and through the slot of said base, and means for holding the base upon the work.

In testimony whereof I hereunto affix my signature.

GEORGE E. MOEN.